Dec. 17, 1946.   W. A. MALTHANER   2,412,626
ICE DETECTING SYSTEM FOR AIRCRAFT
Filed Sept. 13, 1944

INVENTOR
W. A. MALTHANER
BY
ATTORNEY

Patented Dec. 17, 1946

2,412,626

UNITED STATES PATENT OFFICE 2,412,626

ICE DETECTING SYSTEM FOR AIRCRAFT

William A. Malthaner, Summit, N. J., assignor to Bell Telephone Laboratories, Incorporated, New York, N. Y., a corporation of New York Application September 13, 1944, Serial No. 553,944

1 Claim. (Cl. 177—311)

This invention relates to an improved means for detecting and measuring the thickness of ice formation on the exposed surface of an aircraft.

It is the object of this invention to provide an electrical system for detecting and accurately measuring the thickness of ice formation on the exterior surface of an aircraft.

A further object of the invention is to provide a durable, compact electrical detector whose electrical characteristic changes with the formation of ice thereon, capable of being mounted on the exterior surface of an aircraft.

A still further object of the invention is the provision of an electrical device for the detection of ice formation in which the detecting element comprises in a unitary structure a plurality of condenser plates assembled in a manner permitting the adoption of a balanced electrical measuring configuration in which variable stray capacity effects are reduced to a minimum.

A feature of the invention resides in the provision of a detecting device comprising a pair of coplanar electrodes spaced apart and mounted in an aircraft structure with one side of each electrode forming a portion of the exterior surface of the structure and an electrical circuit including the coplanar electrodes and an instrument for indicating change in capacity between the electrodes produced by the formation of ice on the aircraft structure.

A further feature of the invention resides in the provision of a detecting element comprising coplanar detector plates, an intermediate plate adjacent the rear surface of the detector plates and a grounded plate adjacent the rear surface of the intermediate plate, these plates being assembled in spaced relation in a unitary structure and included in a balanced electrical measuring configuration requiring a minimum number of connecting leads whereby variable stray capacity effects likely to interfere with the balance of the electrical measuring configuration are reduced to a minimum.

Further features of the invention will appear from the following description, taken in connection with the accompanying drawing in which.

Figure 1:
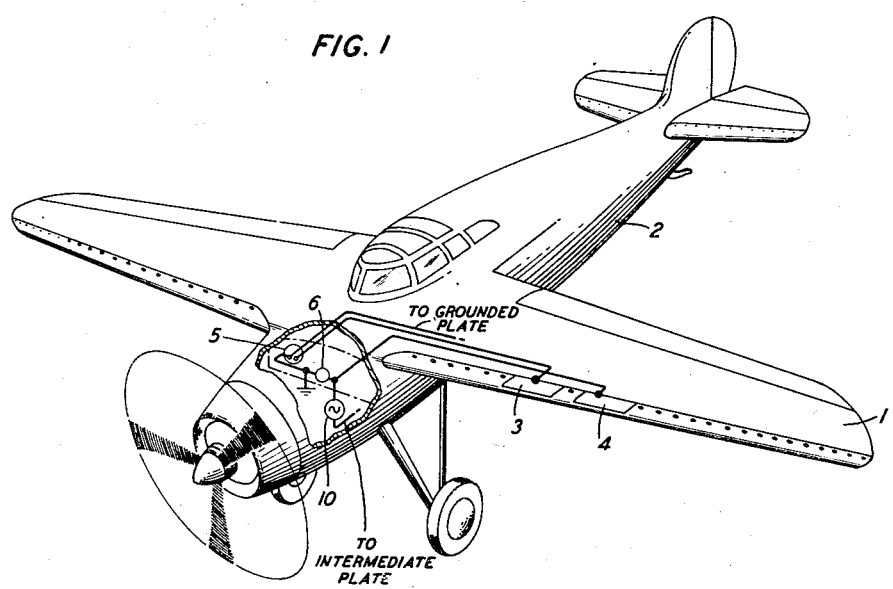
Fig. 1 is a perspective view of an aircraft showing an electrical detector element in accordance with the invention mounted in one wing of the aircraft and the electrically connected indicating means mounted within the aircraft structure in view of the operator.

Referring to Fig. 1, an ice responsive electrical device in accordance with the invention is mounted on that section of the exterior surface of an aircraft where the greatest ice-forming conditions prevail. The leading edge of wing 1 of aircraft structure 2 has mounted therein an electrical detector unit comprising spaced, coplanar condenser plates 3 and 4. These coplanar plates constitute a capacity element in which air forms the dielectric. When ice-forming conditions prevail, the surface of the wing and, therefore, the exposed surface of the coplanar electrodes will be coated with ice which will constitute a dielectric displacing an equivalent volume of the previously existing air dielectric between the plates 3 and 4. As it is quite likely that the thickness of the ice formation will not at all times be uniform along the length of the wing, it is desirable to detect and measure the ice thickness over a length sufficient to give an average thickness for the entire wing length. To this end the over-all length of the detector element probably should be at least one-quarter of the entire wing length.

To avoid undesirable capacitive shunts likely to be introduced by edge capacity between the adjacent ends of the coplanar plates 3 and 4, these plates should be spaced apart a distance equal to or slightly greater than the smaller dimension of the plates.

In the drawing, the plates 3 and 4 are shown as mounted in and forming a portion of the exterior surface of the aircraft structure. It will be understood that the detector element including plates 3 and 4 may be mounted as a separate unit on the exterior surface of the aircraft. The construction as shown in the drawing in which the wing surface and the detector plates are coplanar, obviously provides a more desirable arrangement.

An indicating meter 5 and an adjustable balancing condenser 6 are located in the pilot's cabin and are electrically connected to the capacity element of the detector mounted in the wing.

Figure 2:
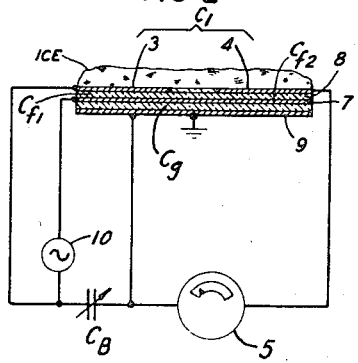
Fig. 2 is a cross-section of the detector element embodying the plurality of condenser plates in a unitary structure in accordance with the invention.

Referring to Fig. 2, the detector element comprises a plurality of condenser plates in a unitary structure, the plates 3 and 4 of which constitute substantially the entire surface of the side of the unit exposed to ice-forming conditions. An intermediate plate 7 is spaced from the rear surface of plates 3 and 4 by dielectric material 8 which may be mica or some other suitable insulating material. The plates 3 and 7 form one capacity element while the plates 4 and 7 form another capacity element. A fourth plate 9 is similarly spaced from the rear surface of plate 7 to form a fourth capacity element. This plate 9 is grounded as shown in the drawing.

The intermediate plate 7 provides means to balance out the capacity effect of the underside of each of the plates 3 and 4. The addition of the grounded plate 9 provides a capacity element which may be conveniently utilized with the other capacity elements and the adjustable balancing capacity 6 to provide a balanced capacity bridge in the detecting and measuring circuit.

Figure 3:
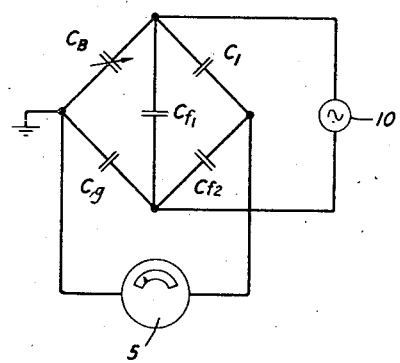
Fig. 3 is a view of the electrical measuring configuration including the plurality of capacity elements formed by the condenser plates of the detector.

In Fig. 3, a balanced capacity bridge is formed by condensers $C_1$, $C_{t1}$, $C_{t2}$, $C_g$, and $C_B$, the latter being the adjustable balancing condenser 6 of Fig. 1.

$C_1$ represents the capacity element formed by the spaced coplanar plates 3 and 4, the capacity of which is altered by the formation of ice on the aircraft surface formed by these plates. $C_{t1}$ represents the capacity element formed by the rear surface of plate 3 and the adjacent face of intermediate plate 7. $C_{t2}$ represents the capacity element formed by the rear surface of plate 4 and the adjacent face of intermediate plate 7. $C_g$ represents the capacity element formed by the rear surface of the plate 7 and the adjacent face of grounded plate 9.

A source of alternating current 10 is connected to one diagonal of the capacity bridge, while the output circuit connected to another diagonal of the bridge includes the indicating meter 5.

At ground level or at low flight altitudes where ice-forming conditions do not exist, the balancing condenser 6 may be adjusted to produce a zero reading on meter 5 with the surrounding air as the dielectric between plates 3 and 4. When ice-forming conditions prevail and the leading edge of the wing receives a coating of ice, the mutual capacity between the plates 3 and 4 will be increased thus disturbing the balance of the capacity bridge to produce alternating voltage in the output circuit including meter 5. The voltage in the output circuit will be dependent in magnitude on the thickness of the ice-formation on the detector plates. The indicator dial of meter 5 may be marked in terms of ice thicknesses by previous calibration of the meter with ice samples of different known thicknesses.

What is claimed is:

An ice warning and measuring system for aircraft comprising in combination, an electrical detector element mounted on the exterior surface of said aircraft, an electrical indicating element, an adjustable capacity element, said indicating element and said adjustable capacity element disposed in said aircraft remote from said detector element, a source of current, an electrical circuit including said three elements and said source of current in a measuring configuration, said detector element comprising in a unitary structure a pair of coplanar electrodes constituting substantially the entire outer surface of a side of said unitary structure exposed to ice-forming conditions, an intermediate electrode spaced from the rear surface of said coplanar electrodes and an electrically grounded electrode spaced from the rear surface of said intermediate electrode, said electrodes cooperating with one another to constitute a plurality of capacity elements included in said electrical circuit.

WILLIAM A. MALTHANER.